US011115529B2

(12) United States Patent
Agarwal et al.

(10) Patent No.: US 11,115,529 B2
(45) Date of Patent: Sep. 7, 2021

(54) SYSTEM AND METHOD FOR PROVIDING AND MANAGING THIRD PARTY CONTENT WITH CALL FUNCTIONALITY

(71) Applicant: Google LLC, Mountain View, CA (US)

(72) Inventors: Amit Agarwal, Sunnyvale, CA (US); Varun Soundararajan, Sunnyvale, CA (US); Gaurav Bhaya, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 15 days.

(21) Appl. No.: 16/714,586

(22) Filed: Dec. 13, 2019

(65) Prior Publication Data
US 2020/0120208 A1 Apr. 16, 2020

Related U.S. Application Data

(63) Continuation of application No. 14/879,999, filed on Oct. 9, 2015, now abandoned, which is a
(Continued)

(51) Int. Cl.
G06Q 30/02 (2012.01)
H04M 3/436 (2006.01)
(Continued)

(52) U.S. Cl.
CPC ..... H04M 3/4365 (2013.01); H04M 3/42034 (2013.01); H04M 3/493 (2013.01); H04M 3/5191 (2013.01)

(58) Field of Classification Search
USPC ........................................................ 705/14.1
See application file for complete search history.

(56) References Cited

U.S. PATENT DOCUMENTS 6,275,806 B1  8/2001  Pertrushin
6,684,249 B1  1/2004  Frerichs et al.
(Continued)

FOREIGN PATENT DOCUMENTS

CN    1552033 A   12/2004
CN  101128819 A    2/2008
(Continued)

OTHER PUBLICATIONS

Examination Report for EP Appln. Ser. No. 16787604.4 dated Mar. 4, 2020 (5 pages.).
(Continued)

Primary Examiner — Afaf Osman Bilal Ahmed
(74) Attorney, Agent, or Firm — Foley & Lardner LLP

(57) ABSTRACT

Systems and methods for implementing an online content item campaign with selective call functionality can include a processor determining a rendering frequency of instances of a third-party content item for rendering with a call icon, based on a resource of the third-party content provider. The processor can provide a first instance of the content item for rendering with the call icon in accordance with the rendering frequency of instances. A call bridge device can receive a call from the client computing device upon actuation of the call icon, direct the call to a phone number of the third-party content provider, and determine a parameter of the call. The processor can adjust the rendering frequency of instances based on the parameter of the call and provide instances of the content item for display by client computing devices with the call icon in accordance with the adjusted rendering frequency of instances.

20 Claims, 4 Drawing Sheets

Related U.S. Application Data continuation-in-part of application No. 14/246,421, filed on Apr. 7, 2014, now abandoned.

(51) Int. Cl.
*H04M 3/42* (2006.01)
*H04M 3/51* (2006.01)
*H04M 3/493* (2006.01)

(56) References Cited

U.S. PATENT DOCUMENTS

| | | |
|---|---|---|
| 6,857,007 B1 | 2/2005 | Bloomfield |
| 7,096,193 B1 | 8/2006 | Beaudoin et al. |
| 7,139,728 B2 | 11/2006 | Rigole |
| 7,428,497 B2 | 9/2008 | Agarwal et al. |
| 7,853,255 B2 | 12/2010 | Karaoguz et al. |
| 7,958,127 B2 | 6/2011 | Edmonds et al. |
| 8,166,013 B2 | 4/2012 | Bandaru et al. |
| 8,195,133 B2 | 6/2012 | Ramer et al. |
| 8,238,540 B1 | 8/2012 | Duva et al. |
| 8,386,386 B1 | 2/2013 | Zhu |
| 8,483,372 B2 | 7/2013 | Park et al. |
| 8,577,016 B1 | 11/2013 | Duva et al. |
| 8,626,910 B1 | 1/2014 | Lientz |
| 8,671,023 B2 | 3/2014 | Gelin |
| 8,750,183 B2 | 6/2014 | Smith et al. |
| 8,903,716 B2 | 12/2014 | Chen et al. |
| 9,529,893 B1 | 12/2016 | Deng et al. |
| 9,723,056 B1 | 8/2017 | Kuo et al. |
| 2002/0120911 A1 | 8/2002 | Hino et al. |
| 2002/0129011 A1 | 9/2002 | Julien |
| 2002/0188606 A1 | 12/2002 | Sun et al. |
| 2003/0050920 A1 | 3/2003 | Sun |
| 2003/0055816 A1 | 3/2003 | Paine et al. |
| 2004/0267725 A1 | 12/2004 | Harik |
| 2005/0076013 A1 | 4/2005 | Hilbert et al. |
| 2006/0069613 A1 | 3/2006 | Marquardt |
| 2006/0099931 A1 | 5/2006 | Trujillo |
| 2007/0097975 A1 | 5/2007 | Rakers et al. |
| 2007/0112656 A1 | 5/2007 | Howe et al. |
| 2007/0127688 A1 | 6/2007 | Doulton |
| 2007/0168506 A1 | 7/2007 | Douglas et al. |
| 2007/0198339 A1 | 8/2007 | Shen et al. |
| 2007/0226057 A1 | 9/2007 | Laruelle et al. |
| 2007/0230374 A1 | 10/2007 | Altberg et al. |
| 2008/0133540 A1 | 6/2008 | Hubbard et al. |
| 2009/0030755 A1 | 1/2009 | Altberg et al. |
| 2009/0063406 A1 | 3/2009 | Golander et al. |
| 2009/0119268 A1 | 5/2009 | Bandaru et al. |
| 2009/0129571 A1 | 5/2009 | Altberg et al. |
| 2009/0132632 A1 | 5/2009 | Jackson et al. |
| 2010/0094860 A1 | 4/2010 | Lin et al. |
| 2010/0169301 A1 | 7/2010 | Rubanovich et al. |
| 2011/0087646 A1 | 4/2011 | Dalvi et al. |
| 2011/0212704 A1 | 9/2011 | Preiss et al. |
| 2011/0258049 A1 | 10/2011 | Ramer et al. |
| 2012/0158484 A1 | 6/2012 | Bhatia |
| 2012/0198056 A1 | 8/2012 | Shama et al. |
| 2012/0265528 A1 | 10/2012 | Gruber et al. |
| 2012/0265610 A1 | 10/2012 | Shama et al. |
| 2013/0006771 A1 | 1/2013 | Parikh |
| 2013/0086641 A1 | 4/2013 | Mehr et al. |
| 2013/0117022 A1 | 5/2013 | Chen et al. |
| 2013/0275164 A1 | 10/2013 | Gruber et al. |
| 2013/0276069 A1 | 10/2013 | Roberson et al. |
| 2013/0304758 A1 | 11/2013 | Gruber et al. |
| 2013/0306249 A1 | 11/2013 | Morton et al. |
| 2014/0180811 A1 | 6/2014 | Boal |
| 2014/0298460 A1 | 10/2014 | Xue et al. |
| 2015/0046421 A1 | 2/2015 | Lisa et al. |
| 2015/0172327 A1 | 6/2015 | Wansley et al. |
| 2015/0278881 A1 | 10/2015 | Agrawal et al. |
| 2015/0287099 A1 | 10/2015 | Soundararajan et al. |
| 2016/0034946 A1 | 2/2016 | Agarwal et al. |
| 2016/0294846 A1 | 10/2016 | Sharov et al. |
| 2017/0092278 A1 | 3/2017 | Evermann et al. |
| 2017/0110130 A1 | 4/2017 | Sharifi et al. |
| 2017/0110144 A1 | 4/2017 | Sharifi et al. |
| 2017/0132019 A1 | 5/2017 | Karashchuk et al. |
| 2017/0262545 A1 | 9/2017 | Qu |
| 2017/0358301 A1 | 12/2017 | Raitio et al. |

FOREIGN PATENT DOCUMENTS

| | | |
|---|---|---|
| CN | 101288093 A | 10/2008 |
| CN | 101295302 A | 10/2008 |
| CN | 101438308 A | 5/2009 |
| CN | 101951376 A | 1/2011 |
| CN | 102663105 A | 9/2012 |
| CN | 102955854 A | 3/2013 |
| EP | 2 362 337 A1 | 8/2011 |
| JP | 2002-287673 A | 10/2002 |
| JP | 2007-148833 A | 6/2007 |
| JP | 2009-525548 A | 7/2009 |
| JP | 2009-531739 | 9/2009 |
| JP | 2010-512579 A | 4/2010 |
| JP | 2010-198084 A | 9/2010 |
| JP | 2013-130955 A | 7/2013 |
| KR | 10-2000-0049799 A | 8/2000 |
| KR | 10-2006-0105362 A | 10/2006 |
| KR | 10-2009-0130364 A | 12/2009 |
| KR | 1020090130364 A | 12/2009 |
| KR | 10-2012-0034600 A | 4/2012 |
| WO | WO-01/71449 | 9/2001 |
| WO | WO-2006/074052 A1 | 7/2006 |
| WO | WO-2008/073701 A2 | 6/2008 |
| WO | WO-2008/134207 A1 | 11/2008 |
| WO | WO-2009/156988 A1 | 12/2009 |
| WO | WO-2010/108157 A2 | 9/2010 |
| WO | WO-2009/125495 A1 | 7/2011 |
| WO | WO2012/012916 A1 | 2/2012 |
| WO | WO-2013/142290 A1 | 9/2013 |

OTHER PUBLICATIONS

Examination Report for EP Appln. Ser. No. 17729601.9 dated Feb. 21, 2020 (12 pages).
Notice of Reasons for Rejection for JP Appln. Ser. No. 2019-508214 dated Mar. 9, 2020 (6 pages).
Examination Report for in Appln. Ser. No. 201947005658 dated Jan. 15, 2021 (7 pages).
First Office Action for CN Appln. Ser. No. 201911005329.6 dated Jul. 10, 2020 (14 pages).
Notice of Allowability for U.S. Appl. No. 15/637,138 dated Jan. 26, 2021 (3 pages).
Notice of Allowance for U.S. Appl. No. 15/637,138 dated Nov. 25, 2020 (5 pages).
Second Office Action for CN Appln. Ser. No. 201680003784.0 dated Oct. 26, 2020 (15 pages).
First Office Action for CN Appln. Ser. No. 201680003784.0 dated Apr. 14, 2020 (20 pages).
Office Action for KR Appln. Ser. No. 10-2018-7022202 dated Apr. 22, 2020 (19 pages).
"10 Tips to Improve the Performance of Google Product Listing Ads", Foghorn Labs, retrieved Mar. 18, 2013 from URL: http://www.foghornlabs.com/2012/11/21/product-listing-ads-best-practices/ (5 pages).
"Click to Text Ads in Beta? Text Message Ads" (4 pages).
"'Dolphin' attacks fool Amazon, Google voice assistants", BBC News, Sep. 7, 2017 (8 pages).
"Products Feed specification", Google Merchant Center Help, Google, Inc., retrieved Mar. 18, 2013 from URL: http://www.support.google.com/merchants/bin/answer.py?hl.en&answer=188494#US (6 pages).
"Supported File Formats", Google Merchant Center Help, Google, Inc., retrieved Mar. 18, 2013 from URL: http://www.support.google.com/merchants/bin/answer.py?hl=en&answer=160567 (1 page).
"Walmart and Google to offer voice-enabled shopping", BBC News, Aug. 23, 2017 (10 pages).
"We Called it. Click-to-Text is Blowing up ADWords", Jun. 29, 2016 (1 page).

(56) References Cited

OTHER PUBLICATIONS

Abrams, Brad, "Help users find interact & re-engage with your app on the Google Assistant", Googie Developers Blog, Nov. 15, 2017 (16 pages).
Advisory Action for U.S. Appl. No. 14/879,999 dated Apr. 22, 2019 (2 pages).
Albrecht, Chris, "Alexa, How Can You Be Used in Restaurants?", The Spoon, Dec. 10, 2017 (6 pages).
Amazon, "Echo Look Hands-Free Camera and Style Assistant", retrieved Aug. 22, 2017 from URL: https://www.amazon.com/gp/product/B0186JAEWK?ref%5F=cm%5Fsw%5Fr%5Ffa%5Fdp%5Ft2%5FC5oazbJTKCB18&pldnSite=1 (7 pages).
Barr, Jeff, "AWS DeepLens—Get Hands-On Experience with Deep Learning With Our New Video Camera", AWS News Blog, Nov. 29, 2017 (11 pages).
Broussard, Mitchel, "Chatbot-Like Sin Patent includes Intelligent image, Video, and Audio Recognition Within Messages", Mac Rumors, May 11, 2017, retrieved Jul. 12, 2017 from URL: https://www.macrumors.com/2017/05/11/siri-chatbot-like-patent/ (11 pages).
Buckland et al., "Amazon's Alexa Takes Open-Source Route to Beat Google Into Cars", Bloomberg, Feb. 27, 2018 (6 pages).
Chen, Lulu Yilun, "Alibaba Challenges Google, Amazon With New Echo-Like Device", Bloomberg, Jul. 5, 2017, retrieved Jul. 12, 2017 from URL: https://www.bloomberg.com/news/articles/2017-07-05/alibaba-challenges-google-amazon-with-new-echo-like-device (3 pages).
Close, Kerry, "Amazon Echo Wit Give You These Deals If You Order Through Alexa This Weekend," Time.com, Nov. 18, 2016 (2 pages).
Clover, Juli, "Amazon and Google Want to Turn Their Smart Home Speakers Into Telephone Replacements", MacRumors, Feb. 15, 2017 (5 pages).
Coberly, Cohen, "Apple patent filing reveals potential whispering Siri functionality", Techspot, Dec. 14, 2017 (4 pages).
Collins, et al., "Can Twitter Save itself?", CNET, Apr. 26, 2017, retrieved Aug. 22, 2017 from URL: https://www.cnet.com/news/twitter-q1-2017-earnings/ (3 pages).
Communication pursuant to Article 94(3) EPC for EP Appl. Ser. No. 15713078.2 dated Nov. 16, 2018 (7 pages).
Communication Pursuant to Article 94(3)EPC for Appl. Ser. No. EP 16787604.4 dated Jun. 14, 2019 (4 pages).
Cook, John, "A Siri for advertising: These mobile ads talk back to you," GeekWire, Apr. 1, 2013, geekwire.com (7 pages).
Cooper,Jack, "AdWords targets SMS growth with new 'click to message' feature", May 26, 2016 (5 pages).
Grist, Ry, "Logitech Harmony's Alexa skill just got a whole lot better", CNET, Jul. 13, 2017 (2 pages).
Decision of Resection for KR Appln. Ser. No. 10-2016-7029150 dated Jan. 29, 2018 (8 pages).
D'Onfro, Jillian, "Facebook just revealed how it will make money from messages", Sep. 22, 2015, Business Insider Inc. (3 pages).
Estes, Adam Clark, "Amazon's Newest Gadget Is a Tablet That's Also an Echo", Gizmodo, Sep. 19, 2017 (3 pages).
Examination Report for EP Appln. Ser. No. 15715065.7 dated Mar. 26, 2018 (10 pages).
Final Office Action for U.S. Appl. No. 14/246,421 dated May 18, 2018 (14 pages).
Final Office Action for U.S. Appl. No. 14/879,999 dated Mar. 1, 2019 (10 pages).
Final Office Action for U.S. Appl. No. 15/055,182 dated Dec. 28, 2018 (15 pages).
Final Office Action for U.S. Appl. No. 14/246,421 dated Feb. 22, 2017 (13 pages).
Final Office Action for U.S. Appl. No. 14/879,999 dated Aug. 11, 2017 (12 pages).
Final Office Action for U.S. Appl. No. 15/637,138 dated Dec. 11, 2019 (29 pages).
First Office Action for CN Appl. Ser. No. 201580016666.9 dated Mar. 5, 2019 (16 pages).
Forrest, Conner, "Essential Home wants to be 'bridge' between Amazon Alexa, Apple's Siri, and Google Assistant," TechRepublic, May 31, 2017 (9 pages).
Foxx, Chris, "Apple reveals HomePod smart speaker", BBC, Jun. 5, 2017 (9 pages).
Gebhart, Andrew, "Google Assistant is spreading, but it needs its own 'Echo Dot'", CNET, May 20, 2017 (6 pages).
Gebhart, Andrew, "Google Home to the Amazon Echo: 'Anything you can do . . .'", CNET, May 18, 2017 (7 pages).
Gibbs, Samuel, "Your Facebook Messenger app is about to be filled with ads", The Guardian, Jul. 12, 2017, retrieved Aug. 22, 2017 from URL: https://www.theguardian.com/technology/2017/jul/12/facebook-messenger-app-adverts (3 pages).
Golgowski, Nina, "This Burger King Ad Is Trying to Control Your Google Home Device", HuffPost, Apr. 12, 2017 (7 pages).
Google Developers Newsletter, "Google Assistant SDK", Google Developers, developers.google.com, accessed on Jul. 12, 2017 (2 pages).
Gurman et al., "Apple Is Manufacturing a Sir Speaker to Outdo Google and Amazon", Bloomberg, May 31, 2017 (3 pages).
Hardwick, Tim, "Facebook Smart Speaker Coming Next Year With 15-inch Touch Panel", MacRumors, Jul. 25, 2017 (5 pages).
Heater, Brian, "Amazon Alexa devices can finally tell voices apart", TechCrunch, Oct. 11, 2017 (6 pages).
International Preliminary Report on Patentability for PCT Appl. Ser. No. PCT/US2017/034247 dated Apr. 18, 2019 (13 pages).
International Preliminary Report on Patentability for PCT Appln. Ser. No. PCT/US/2015/019950, dated Oct. 20, 2016 (8 pages).
International Preliminary Report on Patentability for PCT Appln. Ser. No. PCT/US2015/022167 dated Oct. 4, 2016 (8 pages).
International Search Report & Written Opinion of the International Searching Authority for PCT Appln. Ser. No. PCT/US2015/019950 dated Jun. 17, 2015 (11 pages).
International Search Report and Written Opinion of the International Searching Authority for PCT Appln. Ser. No. PCT/UC2017/034247 dated Aug. 7, 2017 (18 pages).
International Search Report and Written Opinion of the International Searching Authority for PCT Appln. Ser. No. PCT/US2015/022167 dated May 12, 2015 (11 pages).
International Search Report and Written Opinion of the International Searching Authority for PCT Appln. Ser. No. PCT/US2016/055376 dated Jan. 11, 2017 (9 pages).
Johnston, Lisa, "Amazon Whirlwind: New Echo, Plus, Spot, Connect, Fire TV Take The Stage", Twice, Sep. 27, 2017 (10 pages).
Kelion, Leo, "Amazon revamps Echo smart speaker family", BBC News, Sep. 27, 2017 (11 pages).
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (3 pages).
Krishna, Swapna, "Jim Beam's smart decanter will pour you a shot when you ask", engadget, Nov. 29, 2017 (3 pages).
Lacy, Lisa, "Improving search and advertising are the next frontiers for voice-activated devices", TechCrunch, Dec. 20, 2017 (13 pages).
Larson, Selena, "Google Home now recognizes your individual voice", CNN Morley, San Francisco, California, Apr. 20, 2017 (3 pages).
Lee, Dave, "Take Two for Samsung's troubled Bixby assistant", BBC News, Oct. 19, 2017 (6 pages).
Lee, Dave, "The five big announcements from Google I/O", BBC, May 18, 2017 (11 pages).
Lund, Pamela, "Mastering Google Product Feeds and Product Listing Ads—Part 1", retrieved Dec. 28, 2013 from URL: http://www.blueglass.con/blog/mastering-google-product-feeds-and-product-listing-ads-part-1/#comments (17 pages).
Nieva, Richard, "Google Home and eBay can tell you how much that's worth", CNET, Mar. 8, 2017 (3 pages).
Non-Final Office Action for U.S. Appl. No. 14/879,999 dated Jul. 3, 2018 (13 pages).
Non-Final Office Action for U.S. Appl. No. 15/055,182 dated Aug. 16, 2018 (15 pages).

(56) References Cited

OTHER PUBLICATIONS

Non-Final Office Action for U.S. Appl. No. 15/637,138 dated Jun. 24, 2019 (29 pages).
Non-Final Office Action for U.S. Appl. No. 14/229,438 dated Jun. 19, 2015 (12 pages).
Non-Final Office Action for U.S. Appl. No. 14/229,438 dated Nov. 12, 2014 (12 pages).
Non-Final Office Action for U.S. Appl. No. 14/246,421 dated Jun. 26, 2017 (15 pages).
Non-Final Office Action for U.S. Appl. No. 14/246,421 dated Mar. 24, 2016 (10 pages).
Non-Final Office Action for U.S. Appl. No. 14/246,421 dated May 21, 2015 (9 pages).
Non-Final Office Action for U.S. Appl. No. 14/246,421 dated Nov. 24, 2014 (11 pages).
Non-Final Office Action for U.S. Appl. No. 14/879,999 dated Nov. 1, 2016 (12 pages).
Non-Final Office Action for U.S. Appl. No. 14/879,999 dated Sep. 17, 2019 (9 pages).
Notice of Allowance for CN Appln. Ser. No. 201580016666.9 dated Sep. 4, 2019 (6 pages).
Notice of Allowance for JP Appln. Ser No. 2016-559320 dated Jul. 27, 2017 (5 pages).
Notice of Allowance for JP Appln. Ser. No. 2016-561320 dated Jan. 29, 2018 (5 pages).
Notice of Allowance for JP Appln. Ser. No. 2018-032942 dated May 20, 2019 (5 pages).
Notice of Allowance for U.S. Appl. No. 15/055,182 dated Apr. 17, 2019 (8 pages).
Notice of Allowance for U.S. Appl. No. 15/055,182 dated Mar. 1, 2019 (8 pages).
Notice of Allowance for U.S. Appl. No. 15/288,921 dated May 8, 2019 (19 pages).
Notice of Allowance for U.S. Appl. No. 14/229,438 dated Dec. 22, 2015 (11 pages).
Notice of Allowance for U.S. Appl. No. 14/246,421 dated Dec. 1, 2015 (8 pages).
Notice of Allowance for U.S. Appl. No. 15/055,182 dated Jul. 30, 2019 (5 pages).
Notice of Allowance for U.S. Appl. No. 15/288,921 dated Sep. 16, 2019 (5 pages).
Novet, et al., "Amazon is getting ready to bring Alexa to work", CNBC, Nov. 29, 2017 (4 pages).
Office Action for CN Appl. Ser. No. 201580018473.7 dated Jan. 30, 2019 (19 pages).
Office Action for KR Appl. Ser. No. 10-2016-702997 dated Aug. 29, 2018 (13 pages).
Office Action for KR Appl. Ser. No. 10-2016-7027997 dated Feb. 27, 2019 (8 pages).
Office Action for KR Appl. Ser. No. 10-2016-7027997 dated May 3, 2019 (13 pages).
Office Action for KR Appln. Ser. No. 10-2016-7027997 dated Dec. 6, 2017 (18 pages).
Office Action for KR Appln. Ser. No. 10-2016-7029150 dated Jul. 6, 2017 (18 pages).
Office Action for U.S. Appl. No. 15/055,182 dated Jul. 5, 2017 (4 pages).
Office Action for U.S. Appl. No. 15/055,182 dated Sep. 18, 2017 (17 pages).
Palladino, Valentina, "Garmin teamed up with Amazon to make a tiny Echo Dot for your car", ars Technica, Oct. 17, 2017 (2 pages).
Perez, Sarah, "Alexa's 'Routines' will combine smart home control with other actions, like delivering your news and weather", TechCrunch, Sep. 28, 2017 (10 pages).
Perez, Sarah, "The first ad network for Alexa Skills shuts down following Amazon's policy changes", TechCrunch, Jun. 15, 2017 (8 pages).
Porter, Jon, "Amazon Echo Show release date, price, news and features", TechRadar, Jun. 26, 2017 (11 pages).
Pringle, Ramona, "'I'm sorry to hear that': Why training Siri to be a therapist won't be easy", CBC News, Sep. 24, 2017 (3 pages).
Purcher, Jack, "Apple Patent Reveals a New Security Feature Coming to Siri"; Patently Apple, Apr. 4, 2017, reprinted from http://www.patentlyapple.com/patently-apple/2017/04/apple-patent-reveals-a-new-security-feature-coming-to-siri.html (6 pages).
Purcher, Jack, "The Patent behind Google Home's new Feature of Understanding Different Voices in the Home Surfaced Today", Patently Mobile, Apr. 20, 2017, reprinted from http://www.patentlymobile.com/2017/04/the-patent-behind-google-homes-new-feature-of-understanding-different-voices-in-the-home-surfaced-today.html (3 pages).
Purcher, Jack, "Today Google Home's Virtual Assistant can learn its Owner's voice for Security Reasons like Apple's Patent Pending Idea", Patently Apple, Apr. 20, 2017 (4 pages).
Sablich, Justin, "Planning a Trip With the Help of Google Home", New York Times, dated May 31, 2017 (6 pages).
Shawarts, Barry "Google AdWords testing click to SMS ad extension", Jun. 1 7, 2016, Third Door Media, Inc. (6 pages).
Seifert, Dan, "Samsung's new virtual assistant will make using your phone easier"; The Verge, Mar. 20, 2017 (6 pages).
Sherr, Ian, "IBM built a voice assistant for cybersecurity", CNET, Feb. 13, 2017 (9 pages).
Siegal, Daniel, "IP Attys Load Up Apps' Legal Challenges At 'Silicon Beach'", Law360, Los Angeles, California, Feb. 2, 2017 (4 pages).
Simonite, Torn, "How Alexa, Siri, and Google Assistant Will Make Money Off You," Technology Review, May 31, 2016, technologyreview.com (9 pages).
Simonite, Tom, "How Assistant Could End Up Eating Google's Lunch," Technology Review, Sep. 23, 2016, technologyreview.com (8 pages).
Smith, Dave, "The Amazon Echo got 2 incredibly useful features thanks to a new update", Business Insider, Jun. 1, 2017 (2 pages).
Stack Overflow, "How do I stop Outlook from rendering an email address as a mail:to link?" asked and edited by Josh Kodroff, Jan. 22, 2010, retrieved Aug. 13, 2018 from URL: https://stackoverflow.com/questions/2110825/how-do-i-stop-outlook-from-rendering-an-email-address-as-a-mailto-link (13 pages).
Summons to Attend Oral Proceedings for EP Appln. Ser. No. 15715065.7 dated Apr. 24, 2019 (18 pages).
Tran, et al., "Spam Detection in Online Classified Advertisements," WebQuality '11, dated Mar. 28, 2011 (7 pages).
Willens, Max, "For publishers, Amazon Alexa holds promise but not much money (yet)", DIGIDAY, Jul. 6, 2017 (5 pages).
Written Opinion for Appl. Ser. No. PCT/US2017/034247 dated Sep. 4, 2018 (11 pages).
Examination Report for EP Appln. Ser. No. 16787604.4 dated Apr. 21, 2021 (5 pages).
First Office Action for China Patent Application No. 201780000959.7, dated Apr. 13, 2021 (29 pages).
Examination Report for GB Appln. Ser. No. 1720876.0 dated Jun. 25, 2021 (6 pages).

SYSTEM AND METHOD FOR PROVIDING AND MANAGING THIRD PARTY CONTENT WITH CALL FUNCTIONALITY

CROSS-REFERENCE TO RELATED APPLICATIONS

The present application claims the benefit of and priority as a continuation application under 35 U.S.C. § 120 to U.S. patent application Ser. No. 14/879,999, filed on Oct. 9, 2015 and titled "SYSTEM AND METHOD FOR PROVIDING AND MANAGING THIRD PARTY CONTENT WITH CALL FUNCTIONALITY," which is a continuation in-part application of U.S. patent application Ser. No. 14/246,421, filed on Apr. 7, 2014 and titled "METHOD TO COMPUTE THE PROMINENCE SCORE OF PHONE NUMBERS ON WEB PAGES AND AUTOMATICALLY ANNOTATE/ATTACH IT TO ADS," the entirety of each of which is hereby incorporated by reference.

BACKGROUND

In a computerized content delivery network, first-party content providers can provide information for public presentation as resources such as web pages, documents, applications, or other resources. Additional third-party content can also be provided by third-party content providers for presentation on a user device together with the first-party content provided by the first-party content providers. Thus, a user viewing a resource can access the first-party content that is the subject of the resource as well as the third-party content that may or may not be related to the subject matter of the resource.

SUMMARY

At least one aspect is directed to a method of implementing an online content item campaign with selective call functionality in a computer network environment. The method can include a data processing system receiving, via a computer network, a third-party content item from a computing device associated with a third-party content provider and determining, based on an information resource associated with the third-party content provider, a first rendering frequency of instances of the third-party content item for rendering with a call icon. The method can include the data processing system providing a first instance of the third-party content item for rendering with the call icon in accordance with the first rendering frequency of instances. The method can also include call bridge device receiving a call from a client computing device, via the computer network, responsive to actuation of the call icon, directing the call to a phone number associated with the third-party content provider, and determining a parameter of the call. The parameter of the call can be accessible by the data processing system. The method also can include the data processing system adjusting the first rendering frequency of instances to a second rendering frequency of instances based on the parameter of the call, and responsive to adjusting the first rendering frequency of instances, providing a second instance of the third party content item for display by client computing devices with the call icon in accordance with the second rendering frequency of instances as part of the online content item placement campaign.

At least one aspect is directed to a data processing system for implementing an online content item campaign with selective call functionality. The data processing system can include at least one processor, a memory including computer code instructions stored thereon, and a call bridge device, communicatively coupled to the at least one processor. The computer code instructions when executed by the at least one processor can the data processing system to determine, based on an information resource associated with a third-party content provider, a first rendering frequency of instances of a third-party content item for rendering with a call icon. The third-party content item is associated with the third-party content provider. The data processing system can provide, via a communication network, a first instance of the third-party content item for rendering with the call icon in accordance with the first rendering frequency of instances. The call bridge device can receive, via the communication network, the call from the client computing device responsive to actuation of the call icon and direct the call to a phone number associated with the third-party content provider. The call bridge device can also determine a parameter of the call. The parameter of the call can be accessible by the at least one processor. The data processing system can adjust the first rendering frequency of instances to a second rendering frequency of instances based on the parameter of the call and, responsive to adjusting the first rendering frequency of instances, provide a second instance of the third party content item for display by a client computing device with the call icon in accordance with the second rendering frequency of instances as part of the online content item placement campaign.

BRIEF DESCRIPTION OF THE DRAWINGS

The summary is illustrative only and is not intended to be in any way limiting. Other aspects, inventive features, and advantages of the devices or processes described herein, as defined solely by the claims, will become apparent in the detailed description set forth herein and taken in conjunction with the accompanying drawings.

The details of one or more implementations are set forth in the accompanying drawings and the description below. Other features, aspects, and advantages of the disclosure will become apparent from the description, the drawings, and the claims, in which:

Figure 1:
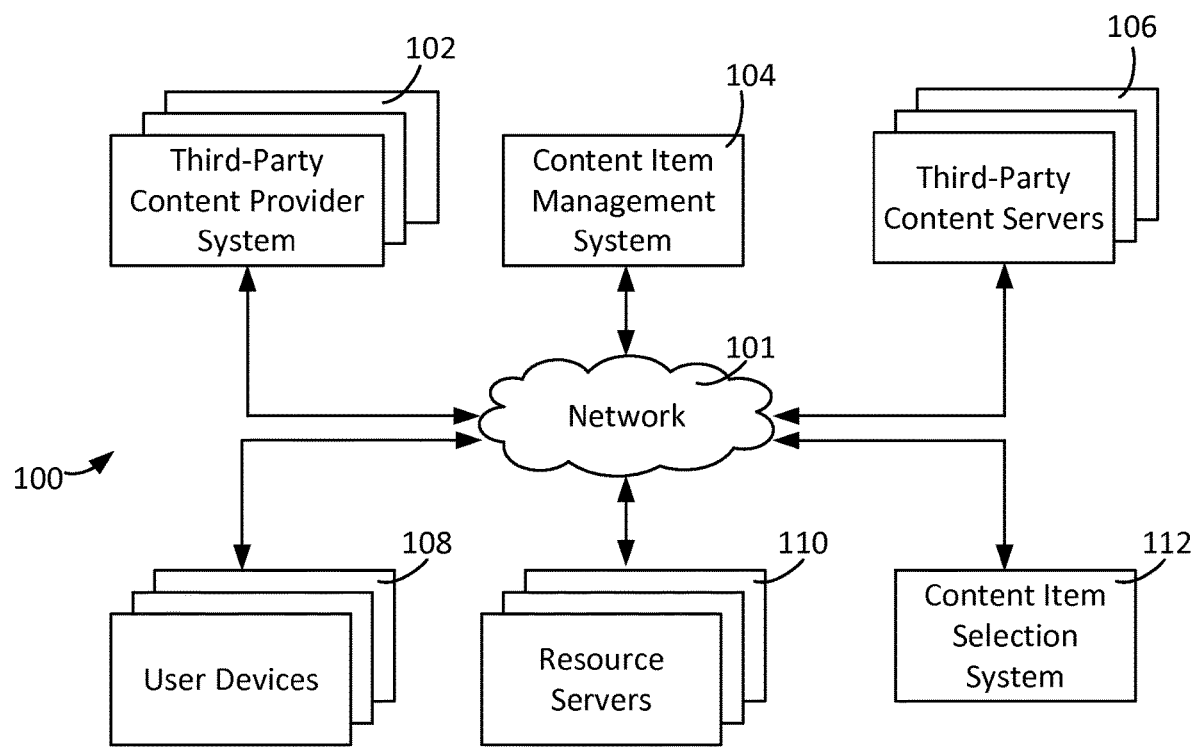
FIG. 1 is a block diagram of a computer system for online content delivery.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatus, and systems for providing information on a computer network. The various concepts introduced above and discussed in greater detail below may be implemented in any of numerous ways, as the described concepts are not limited to any particular manner of implementation. Specific implementations and applications are provided primarily for illustrative purposes.

Third-party content providers when providing third-party content for display on user devices (i.e., client devices) seek to engage users of the client devices to take actions that are of benefit to the third-party content providers. User actions responsive to a displayed third-party content item can include purchasing a product item, purchasing a service, making a donation (such as a donation for a non-profit organization or a political campaign), accessing a website, or a combination thereof. For an online third-party content item, the respective success rate in engaging users (e.g., conversion rate) depends on various factors such as a first-party information resource (e.g., a webpage, an online application or a gaming platform) on which the third-party content is presented, the type and content of the third-party content item, users to which the third-party content is presented, and the timing and frequency of presenting the third-party content item.

Online third-party content items with call functionality (such as content items including or appended to include call icons or content items displayed with a call extension) allow driving phone calls from user devices to third-party content providers. Third-party content providers can generate respective third-party content items with call icons manually. For instance, a third-party content provider can create a call extension or call-only third-party content item having a call icon for calling a business phone number associated with the third-party content provider. The call extension or the call-only third-party content item can also include operation hours of a business associated with the third-party content provider. An online content delivery system can provide the call extension or the call-only third-party content item for display on user devices. A user device on which the third-party content item is displayed can actuate the call icon to initiate a call with the third-party content provider.

In many circumstances, third-party content items having call functionality can be more efficient than third-party content items without call functionality in terms of engaging users. Such advantage comes with technical challenges for third-party content providers and online content delivery systems. For example, manual creation of the call extension or the call-only third-party content item may not be trivial for many third-party content providers, such as small businesses with little technical expertise and that are short on resources. Moreover, when providing third-party content items with call functionality, it may be desirable to manage (or monitor) the call volume generated responsive to actuating call icons displayed with (or within) third-party content items. In particular, a third-party content provider would like the generated call volume not to significantly exceed available resources (such as employees, phone lines, or a combination thereof) for handling calls received from user devices.

Furthermore, it may be desired to monitor parameters of calls generated responsive to actuation of call icons displayed with (or within) content items to assess the success rate of such content items. Assessing the success rate of the content items can include determining the fraction of content items having call functionality that lead to initiation of calls by user devices and determining the fraction of the generated calls that led to a conversion. In order to avoid fragmented and complex solutions for managing delivery of third-party content items with all functionality to user devices, it is desirable to monitor the content items and respective initiated calls by a single entity, such a data processing system delivering content items to user devices.

In the current disclosure, systems methods for providing and managing third-party content items with call functionality allow for a content delivery system to automatically determine whether a third-party content provider would benefit from adding call functionality to respective content items based on content of a web page of the third-party content provider. For instance, the content delivery system can assess the quality of the webpage or check whether the webpage includes a business phone number. The content delivery system can retrieve a first phone number associated with the third-party content provider from the webpage and append (or associate) a content item of the third-party content provider with a call icon. The call icon can be associated with a second phone number associated with the content delivery system. The content delivery system can determine a first rendering frequency of instances of the content item to be provided for rendering with the call icon. For example, the content item delivery system can determine a percentage of the bids associated with the content items for which the content item is to be provided for rendering (in case of successful bid) with the call icon. The content delivery system can provide a first instance of the content item including the call icon for rendering on a first user device in accordance with the first rendering frequency of instances.

Upon actuating the call icon on the first user device, the content delivery system receives a call and direct the received call to phone number of the third-party content provider. That is, actuating the call icon on the user device leads to initiation of call towards a communication device (such as a call forwarding/bridging device) of the third-party content provider. The call forwarding/bridging device can direct the received call towards a phone number of the third-party content provider (such as the phone number retrieved from the webpage). The content delivery system can monitor one or more parameters of the call such as whether the call was answered or not (by the third-party content provider), the duration of the call, geographical location of the user device initiating the call, or a combination thereof. The content delivery system can also record information indicative of the content item that lead to call initiation, keywords used to select the content item for rendering on the user device, or a combination thereof. The content delivery system can collect such information for multiple instances of the content item. In some implementations, the content delivery system can also receive feedback information from the third-party content provider indicative of whether or not the call lead to a conversion.

Based on the collected information, the content delivery system can adjust the first rendering frequency of instances of the content item to a second rendering frequency of instances of the content item including the call icon. For instance, if a larger number of initiated call are not answered by the third-party content provider, the content delivery system can reduce the ratio (or percentage) of instances of the content item to be provided for presentation with the call icon. In some implementations, the content delivery system can adjust such ratio on a keyword basis. In particular, the content delivery system can classify the conversion rates of initiated calls based on the keywords used in selecting the respective instances of the content item. The content delivery system can decide to append the call icon more often to instances of the content item selected based on well performing keywords (e.g., corresponding to previously initiated calls having high conversion rate) while reducing the frequency of using the call icon with instances selected based on less performing keywords. The content delivery system can provide instances of the content item including the call icon for rendering in accordance with the second rendering frequency of instances. As used herein, a rendering frequency of instances with call functionality (such as to be rendered with a call icon) can refer to a percentage or fraction of total instances of the content item or a recurrence rate, such as a number of instances with call functionality per a given time interval. The rendering frequency of instances with call functionality can be indicative of instances of the third-party content item to be rendered (or to be participate in bidding auctions) in association with the call functionality.

FIG. 1 is a block diagram of a computer system 100 for online content delivery. The computer system 100 includes a network 101, third-party content provider system 102, content item management system 104, third-party content servers 106, user devices 108, resource servers 110, and content item selection system 112. The computer system 100 can be configured to automatically manage and control providing third-party content items with call functionality for rendering on user devices 108. The computer system 100 can be configured to automatically append call icons to third-party content items, for instance, based on content of information resources associated with third-party content providers. An information resource can be a landing page of a third-party content provider identified by a uniform resource locator (URL) and hosted on a resource server 110.

The computer system 100 can use at least one computer network such as the network 101. The network 101 can include a local area network (LAN), wide area network (WAN), a telephone network, such as the Public Switched Telephone Network (PSTN), a wireless link, an intranet, the Internet, or combinations thereof.

A third-party content provider system 102 can include one or more communication devices (such as phone devices, fax machines or other communication devices) or one or more computing devices operated by an advertiser or any other content provider. The computing device(s) can include data processors and can connect to the content item management system 104, third-party content servers 106, user devices 108, resource servers 110, and content item selection system 112 using the network 101. A third-party content provider system 102 can also communicate with the content item management system 104 or user devices 108. A third-party content provider system 102 may create or provide a content item, such as text, image, video, web page, or any other content item, to the content item management system 104. The third-party content may be associated with contact information which can be used by a user device 108 to contact the third-party content provider system 102. The content item management system 104 can store the content item in the third-party content server 106. Contact information can include a phone number, mailing address, email address, fax number, video chat handle, instant messaging handle, social media profile, payment information, bank routing number, or any other contact information that provides information for interacting with the third-party content provider. In some implementations, contact information associated with a third-party content item can be displayed along with the content item or embedded within the content item when the content item is displayed on user devices 108, such that the users of the user devices 108 can contact the third party content provider using the contact information. For instance, the third-party content provider system 102 can provide a sales phone number with an advertisement that is displayed to users on user devices 108, so that users can call the third-party content provider on the sales phone number. In some implementations, the content item management system can append a call icon (such as a click to call icon) to the content item. A user device 108 receiving a content item with a call icon can initiate a call towards the third-party content provider by actuating the respective call icon. In some implementations, the call initiated by the user device 108 can be routed via the content item management system 104 or communication device associated with the content item management system 104. The third-party content provider system 102 can also provide a URL that is associated with the content item. The URL may reference an information resource, such as a web page, landing page, online application or gaming platform that is stored on a resource server 110.

In some implementations, the third-party content provider system 102 can connect with the content item management system 104 to manage the selection and serving of content items by content item selection system 112. For instance, the third-party content provider system 102 can set bid values or selection criteria (such as keywords) via a user interface that may include one or more content item conditions or constraints regarding the serving of content items. A third-party content provider system 102 can specify that a content item or a set of content items is to be selected and served for user devices 108 having device identifiers associated with a certain geographic location or region, a certain language, a certain operating system, a certain web browser, etc. In some implementations, the third-party content provider system 102 can specify that a content item or set of content items is to be selected and served when the information resource, such as a web page, document, an application, etc., contains content items that match or are related to certain keywords, phrases, etc. In some implementations, the third-party content provider system 102 can specify that a content item or set of content items is to be selected and served with search results associated with one or more keywords. The third-party content provider system 102 can set a single bid value for several content items, set bid values for subsets of content items, or set bid values for each content item. The third-party content provider system 102 can also set the types of bid values, such as bids based on whether a user clicks on the third-party content item, whether a user initiates a call by actuating a call icon displayed with (or within) the third-party content items, whether a user performs a specific action (such as making a transaction) based on the presentation of the third-party content item, whether the third-party content item is selected and served, or other types of bids.

A content item management system 104 can be a data processing system. The content item management system 104 can include at least one logic device, such as a computing device having a memory device, one or more processors, and at least one communication interface to communicate via the network 101, for instance, with third-party content provider systems 102, third-party content servers 106, user devices 108, resource servers 110, and the content item selection system 112. The one or more processors can execute instructions stored in the memory device to perform one or more operations described herein. In other words, the one or more data processors and the memory device of the content item management system 104 may form a processing module. The content item management system 104 may be combined with third-party content servers 106, content item selection system 112, or a resource server 110 in to one or more computing devices. For instance, a content item selection module may be part of a content item management system 104. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, C, C++, C#, Java®, JavaScript®, Perl®, HTML, XML, Python®, and Visual Basic®. The processor may process instructions and output data to effect extraction of contact information from a resource referenced by the URL provided by a third-party content provider system 102. The processor may also process instructions to receive data via the network 101 and to provide data from the content item management system 104 to the third-party content provider systems 102. In addition to the processing circuit, the content item management system 104 may include one or more databases configured to store data. A data storage device may be connected to the content item management system 104 through the network 101.

In operation, a content item management system 104 receives a content item from a third-party content provider system 102 associated with a respective third-party content provider. In some implementations, the content item does not include call capabilities. The content item management system 104 can access and analyze an information resource of the third-party content provider to determine whether or not to add call functionality to instances of the content item. The content item management system 104 can access the information resource using a respective URL extracted from the information resource or provided by the third-party content provider. The content item management system 104 can add call functionality to a first rendering frequency (such as a fraction or percentage) of instances of the content item when provided for rendering to user devices 108. The content item management system 104 can monitor one or more parameters of calls initiated responsive to display of the content item with call functionality and update the first rendering frequency to a second rendering frequency based on the parameters of the calls.

The third-party content servers 106 can include a computing device, such as a server, configured to store third-party content items. The third-party content server 106 may directly or indirectly provide third-party content items to the content item management system 104, user devices 108, resource servers 110, content item selection system 112, or to other computing devices via network 101. The third-party content servers 106 may be a computer server (e.g., a file transfer protocol (FTP) server, file sharing server, web server, etc.), a combination of servers (e.g., a data center, a cloud computing platform, etc.). In some implementations, the third-party content servers 106 may be any type of memory device capable of storing third-party content provider data, user profile data, content item data, accounting data, auction data or any other type of data used by content item management system 104, the content item selection system 112, or another component of computer system 100.

The third-party content servers 106 may include any type of non-volatile memory, media, or memory devices. For instance, third-party content servers 106 may include semiconductor memory devices (e.g., EPROM, EEPROM, flash memory devices, etc.) magnetic disks (e.g., internal hard disks, removable disks, etc.), magneto-optical disks, or CD ROM and DVD-ROM disks. In some implementations, third-party content servers 106 are local to content item management system 104, content item selection system 112, or resource server 110. In some implementations, third-party content servers 106 are remote data storage devices connected with content item management system 104 or content item selection system 112 via network 101. In some implementations, third-party content servers 106 are part of a data storage server or system capable of receiving and responding to queries from content item management system 104 or content item selection system 112. In some instances, the third-party content servers 106 may be integrated into the content item management system 104 or the content item selection system 112. In some instances, third-party content items may be stored in a database of the content item management system 104 or the content item selection system 112. In some implementations, the third-party content provider systems 102 or the content item management system 104 may store new content items or delete old content items in the third-party content servers 106. In some implementations, the user devices 108, resource servers 110, and content item selection system 112 may request content items stored in the third-party content servers 106.

The content items that are stored in the third-party content servers 106 may be in any format that may be presented on a display of a user device 108, for instance, graphical, text, image, audio, video, etc. The content items may also be a combination or hybrid of the formats. The content items may be banner content items, interstitial content items, pop-up content items, rich media content items, hybrid content items, Flash® content items, cross-domain iframe content items, etc. The content items may also include embedded information such as hyperlinks, metadata, links, machine-executable instructions, annotations, etc.

A third-party content server 106 may have a plurality of third-party content items that are from, for instance, different third-party content providers. In some implementations, the third-party content provider system 102, resource server 110 or the user device 108 can communicate with plurality of third-party content servers 106 and content item selection systems 112. The resource server 110 may alternate between multiple third-party content servers 106 or use a third-party content server 106 for specific content item slots of a web page.

User devices 108 may include any number or type of user-operable electronic devices. For instance, user devices 108 may include a desktop computer, laptop, smart phone, wearable device, smart watch, tablet, personal digital assistant, set-top box for a television set, smart television, gaming console device, mobile communication devices, remote workstations, client terminals, entertainment consoles, or any other devices configured to communicate with other devices via the network 101. Some user devices can be used to dial the advertiser phone number, locate the address, or transfer funds using the payment information. User devices 108 may be capable of receiving resource from resource servers 110 or third-party content items from content item selection system 112, third-party content servers 106, or resource servers 110. The user device 108 may be any form of electronic device that includes a data processor and a memory. The memory may store machine instructions that, when executed by a processor, cause the processor to request a resource, load the resource, and request a content item. The memory may also store data to effect presentation of one or more resources, content items, etc. on the computing device. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript®, C, C++, C#, HTML, Java®, JavaScript®, Perl®, Python®, Visual Basic®, and XML.

The user device 108 can execute a software application (e.g., a web browser, a video game, a chat program, a mobile application, or other application) to request and retrieve resources and contents from other computing devices over network 101. Such an application may be configured to retrieve resources and first-party content from a resource server 110. The first-party content can include text, image, animation, video, or audio information. In some cases, an application running on the user device 108 may itself be first-party content (e.g., a game, a media player, etc.). The first-party content can contain third-party content or require the user devices to request third-party content from a third-party content server. User devices 108 may include a user interface element (e.g., an electronic display, a speaker, a keyboard, a mouse, a microphone, a printer, etc.) for presenting content to a user, receiving user input, or facilitating user interaction with electronic content (e.g., clicking on a content item, hovering over a content item, etc.).

In some implementations, user devices 108 include an application (e.g., a web browser, a resource renderer, etc.) for converting electronic content into a user-comprehensible format (e.g., visual, aural, graphical, etc.). For instance, the user device 108 may execute a web browser application which provides a browser window on a display of the user device. The web browser application that provides the browser window may operate by receiving input of a uniform resource locator (URL), such as a web address, from an input device (e.g., a pointing device, a keyboard, a touch screen, or another form of input device) or from a memory element. In response, one or more processors of the user device 108 executing the instructions from the web browser application may request data from another device connected to the network 101 referred to by the URL address (e.g., a resource server 110). The computing device receiving the request may then provide web page data or other data to the user device 108, which causes visual indicia to be displayed by the display of the user device 108. Accordingly, the browser window displays the retrieved first-party content, such as web pages from various websites, to facilitate user interaction with the first-party content. User devices 108 may function as a user agent for allowing a user to view HTML encoded content. The third-party content can be displayed along with the first-party content. The third-party content may or may not be related to the subject matter of the first-party content. The third-party content can be provided to the user devices 108 and resource servers 110 by third-party content servers 106. User devices 108 may include a processor capable of processing embedded information (e.g., meta information embedded in hyperlinks, etc.) and executing embedded instructions. Embedded instructions may include computer-readable instructions (e.g., software code, JavaScript®, ECMAScript®, etc.) associated with a content item slot within which a third-party content item is presented.

In an illustrative instance, a user device 108 using a web browser can browse to a web page provided by a web page publisher. The web page publisher may be the first-party content provider and the web page may be the first-party content. The web page can be provided by a resource server 110. The user device 108 loads the web page which contains a third-party content item, such as an ad. In some implementations, the resource server 110 may receive an ad from an ad server and provide the ad with the web page to a user device 108. The ad server may be a third-party content server 106. For instance, the web page publisher may provide search engine results and the ads may be provided with the search results. In other implementations, the web page may contain a link that either directly or indirectly references an advertisement (ad) server. For instance, as a web browser on a user device loads the web page, the user device requests the ad and receives it from the ad server. The ad server receives the ad from an advertiser. The advertiser may be a third-party content provider 106. The advertiser may create or provide information to generate the ad. The ad may link to a landing page which can be another web page or resource. The link can be provided by the advertiser. The ad can also include advertiser's contact information or a call icon to call the advertiser or a business associated with the advertiser.

In some implementations, user devices 108 are capable of detecting an interaction with a distributed content item. An interaction with a content item may include displaying the content item, hovering over the content item, clicking on the content item, viewing source information for the content item, actuating a call icon of the content item, or any other type of interaction between user devices 108 and a content item. Interaction with a content item does not require explicit action by a user with respect to a particular content item. In some implementations, an impression (e.g., displaying or presenting the content item) may qualify as an interaction. The criteria for defining which user actions (e.g., active or passive) qualify as an interaction may be determined on an individual basis (e.g., for each content item) by content item selection system 112 or by content item management system 104.

User devices 108 may generate a variety of user actions. For instance, user devices 108 may generate a user action in response to a detected interaction with a content item. The user action may include a plurality of attributes including a content identifier (e.g., a content ID or signature element), a device identifier, a referring URL identifier, a timestamp, or any other attributes describing the interaction. User devices 108 may generate user actions such as resource views, online purchases, search queries submitted, etc. The user devices 108 can communicate the user actions to a click server, the content item management system 104 or a separate accounting system.

In some implementations, the system 100 may further comprise a click server. In some implementations, the click server may be part of the content item selection system 112, the content item management system 104, or another server connected to the network 101. In some implementations, the click server may be a separate server connected to the network 101. The click server receives a request from a user device 108 when the user interacts with the content item that the user device 108 receives from the content item selection system 112. For instance, a user may engage with a content item by selecting contact information that is provided along with the content item. The click server may receive the request and update a performance metric stored in the content item management system 104 or the third-party content server 106. For instance, the metric may be a user engagement with an advertisement. The performance metric may be stored in association with the provided third-party content item in the third-party content server 106. The click server may redirect the user device 108 to a resource that is stored in a resource server 110, wherein the resource may be the landing page that is identified by the URL provided by the third-party content provider system 102.

For situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether or how to receive content item from the content server that may be more relevant to the user. In addition, certain data may be treated (e.g., by content item selection system 112) in one or more ways before it is stored or used, so that personally identifiable information is removed. For instance, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected (e.g., by an application, by user devices 108, etc.) and used by content item selection system 112.

The resource servers 110 can include a plurality of computing devices. A computing device may be a server, configured to host a resource, such as a web page or other resource (e.g., articles, comment threads, music, video, graphics, search results, information feeds, etc.). The resource server 110 may be a computer server (e.g., a file transfer protocol (FTP) server, file sharing server, web server, etc.) or a combination of servers (e.g., a data center, a cloud computing platform, etc.). One resource server 110 can provide resource data or other content (e.g., text documents, PDF files, and other forms of electronic documents) to the user device 108, and another resource server 110 can provide the resource referenced by a URL provided by a third-party content provider along with a content item. For instance, one resource server can host a publisher web page or a search engine, and another resource server can host a resource such as a landing page referenced by an advertiser; in some instances, one resource server 110 may host both resources. A first-party content provider can provide first-party content to a resource server 110. The resource server 110 may request a third-party content server 106 for third-party content and transmit the received third-party content to a user device 108 along with the first-party content. In one implementation, the user device 108 can access the resource server 110 via the network 101 to request data to effect presentation of a resource of the resource server 110. In one implementation, the content item management system 104 can access another resource server 110 via the network 101 to request the resource referenced by the URL provided by a third-party content provider system 102.

Resources provided by the resource server 110 may include any type of information or data structure that can be provided over network 101. In some implementations, resources may be identified by a resource address associated with the resource server 110 (e.g., a URL). Resources may include web pages (e.g., HTML web pages, PHP web pages, etc.), word processing documents, portable document format (PDF) documents, images, video, programming elements, interactive content, streaming video/audio sources, or other types of electronic information. Resources provided by the resource server 110 may be web pages, local resources, intranet resources, Internet resources, or other network resources. In some implementations, resources include one or more web pages to which user devices 108 are directed (e.g., via an embedded hyperlink) when user devices 108 interact with a third-party content item provided by a content item selection system 112. Resources may contain references, such as hyperlinks, to other resources or web pages. For instance, a first-party content may contain links to other first-party content in a same URL domain or subdomain. In another instance, a third-party content item may contain references to other resources or web pages.

The content item selection system 112 can include at least one logic device, such as a computing device having a data processor, to communicate via the network 101, for instance with a third-party content provider system 102, content item management system 104, third-party content server 106, user devices 108, or resource servers 110. In some implementations, the content item selection system 112 may include third-party content servers 106. The content item selection system 112 can include a server, such as an advertisement server or otherwise.

In one implementation, a content item selection system 112 can receive, via the network 101, a request for a content item. The received request may be sent from a resource server 110, a user device 108, or any other computing device in the system 100. The resource server 110 may be owned or operated by a first-party content provider. The resource server 110 or the resource may include instructions for one or more content item selection systems 112 to provide third-party content items with one or more resources of the first-party content provider on the resource server 110. In one implementation, the resource may include a web page. The user device 108 may be a computing device operated by a user (represented by a device identifier), which, when accessing a resource of the resource server 110, can make a request to a content item selection system 112 for content items to be presented with the resource, for instance. The content item request can include requesting device information (e.g., a web browser type, an operating system type, one or more previous resource requests from the requesting device, one or more previous content items received by the requesting device, a language setting for the requesting device, a geographical location of the requesting device, a time of a day at the requesting device, a day of a week at the requesting device, a day of a month at the requesting device, a day of a year at the requesting device, etc.) and resource information (e.g., URL of the requested resource, one or more keywords associated with the requested resource, text of the content of the resource, a title of the resource, a category of the resource, a type of the resource, etc.). The information that the content item selection system 112 receives can include a HyperText Transfer Protocol (HTTP) cookie which contains a device identifier (e.g., a random number) that represents the user device 108. In some implementations, the device information or the resource information may be appended to a content item request URL (e.g., contentitem.item/page/contentitem?devid=abc123&devnfo=A34r0). In some implementations, the device information or the resource information may be encoded prior to being appended the content item request URL. The requesting device information or the resource information may be utilized by the content item selection system 112 to select third-party content items to be served with the requested resource and presented on a display of a user device 108.

In some instances, the request for content item may be part of a web page or other resource (such as, for instance, an application) that includes one or more content item slots in which a selected and served third-party content item may be displayed. The code (e.g., JavaScript®, HTML, etc.) defining a content item slot for a web page or other resource may include instructions to request a third-party content item from the content item selection system 112 to be presented with the web page. In some implementations, the code may include an image request having a content item request URL that may include one or more parameters (e.g., /page/contentitem?devid=abc123&devnfo=A34r0). Such parameters may, in some implementations, be encoded strings such as "devid=abc123" or "devnfo=A34r0."

Content item selection system 112, when selecting and serving third-party content items for presentation with requested resources via the Internet or other network, may be controlled or otherwise influenced by a third-party content provider that utilizes a content item management system 104. For instance, a third-party content provider may specify selection criteria (such as keywords) and corresponding bid values that are used in the selection of the third-party content items. The bid values may be utilized by the content item selection system 112 in an auction to select and serve content items for presentation with a resource. For instance, a third-party content provider may place a bid in the auction that corresponds to an agreement to pay a certain amount of money if a user interacts with the provider's content item (e.g., the provider agrees to pay $3 if a user clicks on the provider's content item). In other instances, a third-party content provider 102 may place a bid in the auction that corresponds to an agreement to pay a certain amount of money if the content item is selected and served (e.g., the provider agrees to pay $0.005 each time a content item is selected and served or the provider agrees to pay $0.05 each time a content item is selected or clicked). In some instances, the content item selection system 112 uses content item interaction data to determine the performance of the third-party content provider's content items. For instance, users may be more inclined to click on third-party content items on certain webpages over others. Accordingly, auction bids to place the third-party content items may be higher for high-performing webpages, categories of webpages, or other criteria, while the bids may be lower for low-performing webpages, categories of webpages, or other criteria.

In some instances, content item selection system 112 may determine one or more performance metrics for the third-party content items and the content item management system 104 may provide indications of such performance metrics to the third-party content provider 102 via a user interface. For instance, the performance metrics may include a cost per impression (CPI) or cost per thousand impressions (CPM), where an impression may be counted, for instance, whenever a content item is selected to be served for presentation with a resource. In some instances, the performance metric may include a click-through rate (CTR), defined as the number of clicks on the content item divided by the number of impressions. In some instances, the performance metrics may include a cost per engagement (CPE), where an engagement may be counted when a user interacts with the content item in a specified way. An engagement can be sharing a link to the content item on a social networking site, submitting an email address, taking a survey, or watching a video to completion. Still other performance metrics, such as cost per action (CPA) (where an action may be clicking on the content item or a link therein, a purchase of a product, a referral of the content item, etc.), conversion rate (CVR), cost per click-through (CPC) (counted when a content item is clicked), cost per sale (CPS), cost per lead (CPL), effective CPM (eCPM), or other performance metrics may be used. The various performance metrics may be measured before, during, or after content item selection, content item presentation, user click, or user engagement. In some implementations, performance metrics may be measured by a click server.

The content item selection system 112 may select a third-party content item to serve with the resource based on several influencing factors, such as a predicted click through rate (pCTR), a predicted conversion rate (pCVR), a bid associated with the content item, etc. Such influencing factors may be used to generate a value, such as a score, against which other scores for other content items may be compared by the content item selection system 112 through an auction.

During an auction for a content item slot for a resource, such as a webpage, content item selection system 112 may utilize several different types of bid values specified by third-party content providers 102 for various third-party content items. For instance, an auction may include bids based on whether a user clicks on the third-party content item, whether a user performs a specific action based on the presentation of the third-party content item, whether the third-party content item is selected and served, or other types of bids. For instance, a bid based on whether the third-party content item is selected and served may be a lower bid (e.g., $0.005) while a bid based on whether a user performs a specific action may be a higher bid (e.g., $5). In some instances, the bid may be adjusted to account for a probability associated with the type of bid or adjusted for other reasons. For instance, the probability of the user performing the specific action may be low, such as 0.2%, while the probability of the selected and served third-party content item may be 100% (e.g., the selected and served content item will occur if it is selected during the auction, so the bid is unadjusted). Accordingly, a value, such as a score or a normalized value, may be generated to be used in the auction based on the bid value and the probability or another modifying value. In the prior instance, the value or score for a bid based on whether the third-party content item is selected and served may be $0.005*1.00=0.005 and the value or score for a bid based on whether a user performs a specific action may be $5*0.002=0.01. To maximize the income generated, the content item selection system 112 may select the third-party content item with the highest value from the auction. In the foregoing instance, the content item selection system 112 may select the content item associated with the bid based on whether the user performs the specific action due to the higher value or score associated with that bid.

Once the content item selection system 112 selects a third-party content item, data to effect presentation of the third-party content item on a display of the user device 108 may be provided to the user device 108 using a network 101.

The user on the user device 108 may select or click on the provided third-party content item. In some instances, a URL associated with the third-party content item may reference another resource, such as a web page or a landing page. In other instances, the URL may reference back to the content item selection system 112, a third-party content server 106, or a content item management system 104. One or more metrics are updated, such as a click-thru or engagement, and the user device is redirected to a resource, such as a web page or a landing page, that has been provided by a third-party content provider 102 along with the third-party content item.

Figure 2:
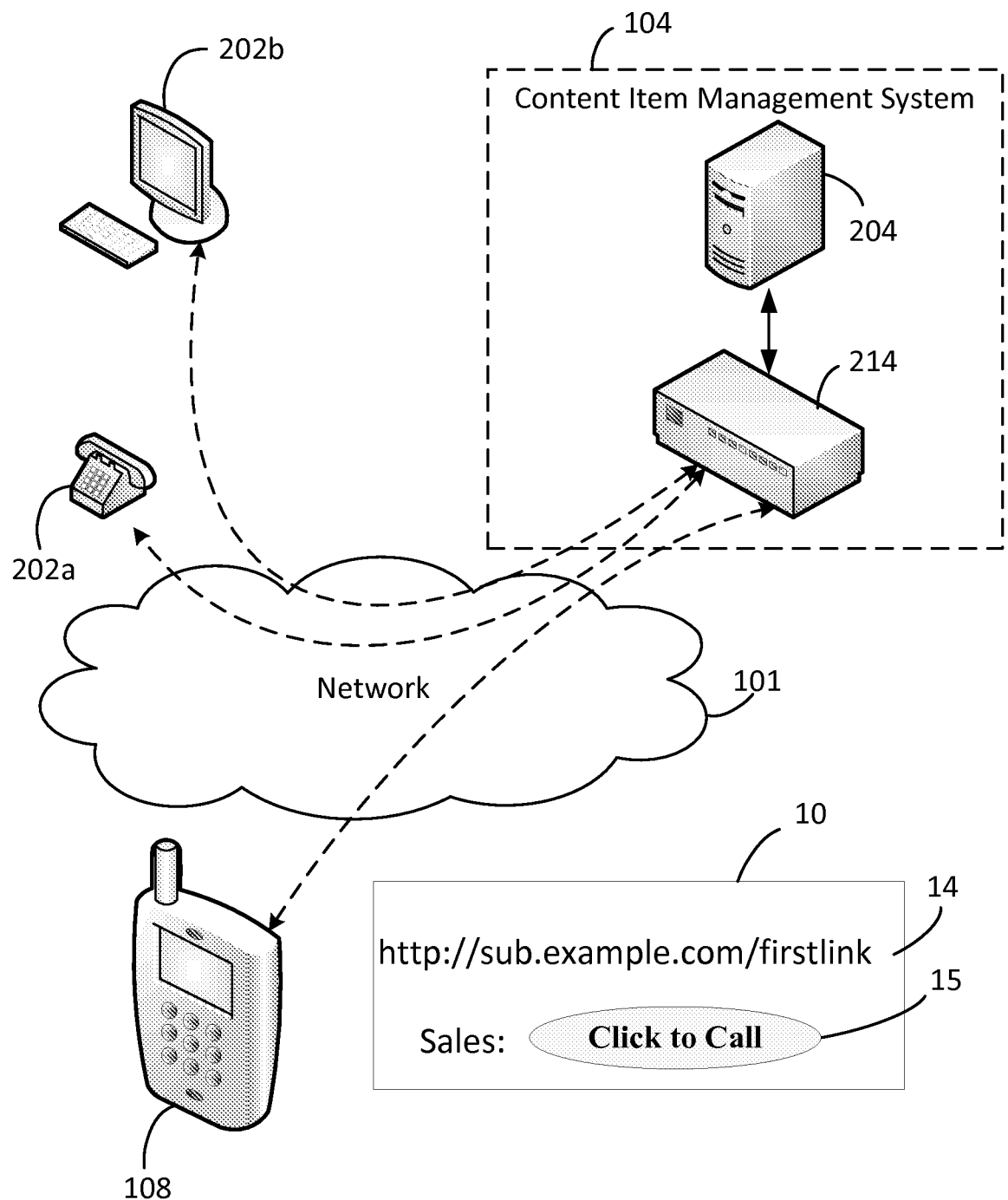
FIG. 2 is a diagram illustrating a computer system capable of providing and managing third-party content items with call functionality.

FIG. 2 is a diagram illustrating a computer system 200 capable of providing and managing third-party content items with call functionality. In brief overview, the communication system 200 includes the network 101, a user device 108, computer server 204, a call bridge device 214, and a communication device 202a or 202b (also referred to individually or collectively as communication device(s) 202) associated with a third-party content provider. The computer server 204 and the call bridge device 214 can be associated with the content item management system 104 shown in FIG. 1.

Referring to FIGS. 1 and 2, among others, the computer server 204 can be a computer server of the content item management system 104. In general, the computer server 204 can be associated with a content delivery system capable of delivering third-party content to user devices 108. A content delivery system can be a data processing system including the content item management system 104 and the content item selection system 112. The computer server 204 can obtain a content item associated with a respective third-party content provider. The computer server 204 can obtain the content item from a third-party content server 106 or directly from a the third-party content provider system 102. In some implementations, the content item does not include call functionality. In some implementations, the computer server 204 can obtain multiple versions of the content item. For instance, the computer server 204 can obtain at least one version of the content item having call functionality and at least one other version without call functionality.

In some implementations, the computer server 204 can analyze content associated with an information resource (such as a website) of the third-party content provider to determine the rendering frequency of instances. For instance, the computer server 204 can parse and analyze a document object model (DOM) tree of the resource, cascading style sheets (CSS) of the resource, loaded text of the resource or optical character recognition (OCR) of the source to determine a quality of a webpage (such as mobile webpage) of the resource, whether the resource includes a phone number of the third-party content provider, the amount or quality of resource content or other features of the website. In some implementations, the computer server 204 can check other information (such as information stored in a resource server 110) associated with the resource including a number of visits to the resource, user interaction history (such as download and navigation actions) associated with the resource or other information indicative of online historical information of the resource.

In some implementations, the computer server 204 can determine a prominent phone number by computing a prominence score for each phone number appearing in the content of the information resource. The computer server 204 can compute the prominence score for a given phone number (or a contact information in general) based one or more factors including the number of times that phone number appears in the resource, the number of other phone numbers in the resource, the font characteristics (such as font size, font style, font color, underline style or any other effects such as blinking, contrast or animation effects) of the phone number, the location of the phone number within the resource, the content (such as graphics, image, text, audio or video) proximate to the phone number within the resource, or a combination thereof. In some implementations, the computer server 204 can select one or more phone numbers with highest prominence scores as phone numbers for contacting the third-party content provider.

Using information associated with the information resource, the computer server 204 can determine whether adding a call functionality to the third-party content item would enhance the performance (such as a conversion rate) of content item. For instance, existence of a prominent phone number (i.e., phone number with high prominence score) in the content of the resource, a poor quality of the resource or a rendering frequency thereof (such as a mobile webpage), low online activity associated with the resource, or any combination thereof can indicate that an added call functionality most likely would improve the performance of the content item. In some implementations, the computer server 204 can consider other information provided by the third-party content provider (such as information indicative of a type of business, size of business, location of business or whether the third-party content provider subscribed to a service of automatically adding call functionality to content items) when determining whether or not to provide the content item for rendering with call functionality.

Upon determining that an added call functionality would most likely improve the performance of the content item and befit the third-party content provider, the computer server 204 can generate a call extension 10. The call extension 10 can include a call icon 15 and computer executable instructions (not shown in FIG. 2) for initiating a call to a phone number when the call icon 15 is actuated. In some implementations, the computer server 2204 can assign a phone number associated with a data processing system (such as a content delivery system including the content item management system 104 and the content item selection system 112). In particular, the phone number can be associated with the call bridge device 214 and actuating the call icon 15 would cause initiation of a call towards the call bridge device 214. The call bridge device 214 can forward the initiated call to the phone number of the third-party content provider retrieved from the information resource. The forwarded call can be answered at a communication device 202 associated with the third-party content provider. The communication device 202 can be a phone device, a mobile phone, a tablet, a computer device including a VoIP application, or other electronic device capable of initiating a voice call. In some implementations, the computer server 204 can assign a static phone number of the call bridge device 214 to the call icon 15. A static assignment of a phone number can include assigning a single phone number to multiple instances of the content item or to various content items. In some implementations, the computer server 204 can dynamically assign a phone number associated with the call bridge device 214 to the call icon 15. A dynamic assignment of a phone number allows for determining the content item or an instance thereof based on the phone number of the call bridge device 214 assigned to the call icon 15. For instance, the assignment of the phone number associated with the call bridge device 214 can include dynamically selecting a phone number from a list of phone numbers associated with the call bridge device 214 each time an instance of the content item with call functionality is to be provided for rendering.

In some implementations, the call extension 10 can also include a link of the information resource of the third-party content provider. In some implementations, the computer server 204 can generate a first content item extension including only a call icon 15, a second content item extension including a call icon 15 and a resource link 14, a third content item extension including only a resource link 14 or any combination thereof. In some implementations, the call extension 10 can be provided for rendering with the content item. In some implementations, the call extension 10 can be inserted within the content item. For instance, generating the call extension 10 can include modifying the content item to insert the call icon 10 therein. In some implementations, modifying the content item can include deleting or inserting a resource link 14. In some implementations, modifying the content item can include generating multiple versions of the content item with and without the call icon or with and without a resource link 14.

The computer server 204 can determine an initial rendering frequency of instances (such as a percentage, ratio or a frequency rate) of the content item to be provided for rendering with the call functionality (such as with the call icon 10). The rendering frequency of instances can include a percentage, ratio or frequency of bids for selecting the content item for rendering with the call functionality. For instance, the computer server 204 can initially determine that 50% of the bids (or a certain number of bids per day) associated with the content item would be bids for rendering the content item with the call functionality. In some implementations, the rendering frequency of instances can include a percentage, ratio or frequency of instances of the content item to be provided for rendering. For instance, the computer server can initially determine that 50% of winning bids (or a certain number of winning bids per day) associated with the content item would lead to rendering the content item with the call functionality. In some implementations, the initial rendering frequency of instances can be equal to a default value once the computer server 204 determines that call functionality would enhance the performance of the content item. In some implementations, the computer server 204 can determine the initial rendering frequency of instances based on information associated with the information resource of the third-party content provider or information obtained from the third-party content provider, such as the type or size of the business. For instance, for a business with a relatively large group of sales personnel or a taxi service business, the computer server 204 can assign a relatively large rendering frequency of instances (such as larger than 50%) of the content item to be provided for rendering with call functionality.

In some implementations, the computer server 204 can determine a rendering frequency of instances of the content item to include the call functionality, a second rendering frequency of instances to include the information resource link 14, and a third rendering frequency of instances to include both the information resource link 14 and the call functionality. In some implementations, the computer device 204 can assign the initial rendering frequency(s) of instances differently for distinct geographical locations of user devices 108 initiating calls, distinct keywords used in selecting the content item, distinct dates, or distinct times of the day. For instance, if the information resource includes specific operation hours, the computer server 204 can provide the content item for rendering with the call functionality only during the specified operation hours.

The computer server 204 can provide instances of the content item for rendering with call functionality according the determined rendering frequency(s) of instances. For instance, if the determine rendering frequency(s) of instances indicate that in 50% of the winning bids the content item is to be presented with call functionality, the computer server 204 can provide the content item for rendering with the call icon 10 every other winning bid. Also, if the determine rendering frequency(s) of instances indicate that the content item is to be provided for rendering with the call functionality only within certain operation hours (or time), then the computer server 204 won't provide the call icon for rendering beyond the specified operation period. Upon display of the content item with (or including) the call extension 10 on a user device 108, the user device 108 can actuate the call icon 15 to initiate a voice call for contacting the third-party content provider. The computer executable instructions associated with the call extension 10 can cause the user device 108 to initiate the call (upon actuation of the call icon 15) via a phone capability module of the user device 108, such as a subscriber identification module (SIM) card or a voice-over-IP (VoIP) application. Actuating the call icon 10 by the user device 108 can include clicking on, tapping, hovering over, or more generally selecting the call icon 15.

The call bridge device 214 can receive the initiated call and direct it to the phone number of the third-party content provider (such as the phone number retrieved from the information resource). The call can be a video call or a voice call. The forwarded call can be answered at the communication device 202 of the third-party content provider by a human or automatic agent. The call bridge device 214 can record (or monitor) one or more parameters of the forwarded call, such as latency time (i.e., wait time till the call is answered or user device 108 hangs up), indication of whether the call is answered or not, duration of the call, geographical location of the calling user device 108 (such as using the respective IP address, area code or global positioning service (GPS) information), time and date of the call, an indication of the phone number associated with the call bridge device 214 used to initiate the call, or a combination thereof. The call bridge device 214 can be communicatively coupled to the computer server 204 and can send the recorded one or more parameters of the call to the computer server 204. The call bridge device 214 can include a session border controller (SBC) device configured to control the signaling and the media streams involved in setting up, conducting, bridging and tearing down telephone calls or other interactive media communications. The SBC device can maintain (or have access to) a data structure mapping the phone number assigned to the call icon 15 to the phone number of the third-party content provider. The SBC device can include (or be coupled to) one or more hardware switches for directing a call received from the user device 108 to the communication device 202.

The computer server 204 can obtain the one or more parameters of the call from the call bridge device 214. The computer server 204 can store indications of the one or more parameters of the call in association with at least one of an identifier of the content item, an identifier of the content item instance that lead to the initiation of the call and an identifier of a keyword based on which the content item instance was selected for rendering. The computer server 204 can also obtain from the third-party content provider conversion information of the call forwarded to the phone number associated with the third-party content provider. For instance, the third-party content provider system 102 can send information indicative of whether or not the forwarded call lead to a transaction between a user of the user device 108 and the third-party content provider. The computer server can store indication of the conversion information in association with at least one of an identifier of the content item, an identifier of the content item instance that lead to the initiation of the call and an identifier of a keyword based on which the content item instance was selected for rendering. In some implementations, the computer server 204 can be configured to collect and store information indicative of the one or more parameters, call conversion data, other information associated with the content item for a plurality of instances of the content item. For instance, the computer server 204 can be configured to record statistical data indicative of at least one of the statistical parameters including a call initiation rate (such as the ratio of rendered instances of the content item that lead to call initiation on user devices 108), call success rate (such as the ratio of calls answered), call average latency (average time between call initiation and the time the same call is answered) and call conversion rate (such as the ratio of calls that lead to a conversion). The computer server 204 can be configured to record the statistical parameters in association with at least one of user device location, day of the week or date, time of the day, and keywords used in selecting content item instances. In some implementations, the computer server can also monitor a conversion rate associated with the link of the information resource associated with third-party content provider (such as the ratio of conversions per click on the information resource link). In some implementations, the statistical parameter(s) can be computed based on data collected over a given time period (such as the last three or six months).

The computer server 204 can update the determined rendering frequency(s) of instances of the content item for rendering with the call functionality based on the call parameter(s), the call conversion information, one or more of the recorded statistical parameters or a combination thereof. For instance, if the call latency (or an average thereof) is high or the call success rate (or an average thereof) is low, the computer server 204 can adjust the initial rendering frequency of instances to a second rendering frequency of instances smaller than the initial rendering frequency. However, if the call latency (or an average thereof) is low and the call success rate (or an average thereof) is high, the computer server 204 can adjust the initial rendering frequency of instances to a second rendering frequency of instances greater than the initial rendering frequency. In some implementations, such adjustment can be applied to rendering frequency(s) associated with a given time period (such as a time of day or date) when the call latency is high (or low) or when the call success rate is low (or high). If the computer server 204 determines that calls associated with a given keyword (such as the keyword used in selecting the content item) have a higher conversion rate than calls associated with one or more other keywords, the computer server 204 can increase the rendering frequency of instances associated with that keyword. The computer server 204 can, for instance based on conversion rates associated with of calls one or more keywords, tune the raking of keywords associated with content item, change the list of keywords (e.g., by deleting a keyword) associated with the content item, or change a subset of keywords for which call capability is to be added. Also, if the computer server 204 determines that calls associated with a given geographic location (such as a geographic location associated with calling user devices 108) have a higher conversion rate than calls associated with one or more other geographic locations, the computer server 204 can increase the rendering frequency of instances associated with that geographic location. In instances where the computer server 204 determines that content item instances including the call functionality are performing significantly better than instances rendered with the link of the information resource, the computer server 204 can increase the rendering frequency of instances for rendering with the call icon 10 while reducing the rendering frequency of instances for rendering with the link of the information resource. In some implementations, a plurality of factors can be considered at the same time when deciding whether to adjust a rendering frequency of instances of the content item.

In some implementations, the process of monitoring call parameters and adjusting one or more rendering frequency of instances of the content item can be a continuous (or iterative) process. In some implementations, the process of monitoring call parameters and adjusting one or more rendering frequency of instances of the content item can be repeated until values of various rendering frequency of instances are achieved where certain conditions are met. Such conditions can include a low call latency (such as compared to a respective threshold value), high call success rate (such as compared to a respective threshold value), substantial increase in conversion rate, or a combination thereof.

The computer server 204 can provide instances of the content item with (or without) the call functionality according to the adjusted rendering frequency of instances of the content item. For instance, if a rendering frequency of instances of the content item for rendering with the call functionality associated with a given keyword is increased, the computer sever 204 can provide more instances of the content item for rendering with the call functionality when the content item is elected for rendering based on that keyword. The computer sever 204 can also provide less instances of the content item for rendering without the call functionality when the content item is elected for rendering based on that keyword.

Figure 3:
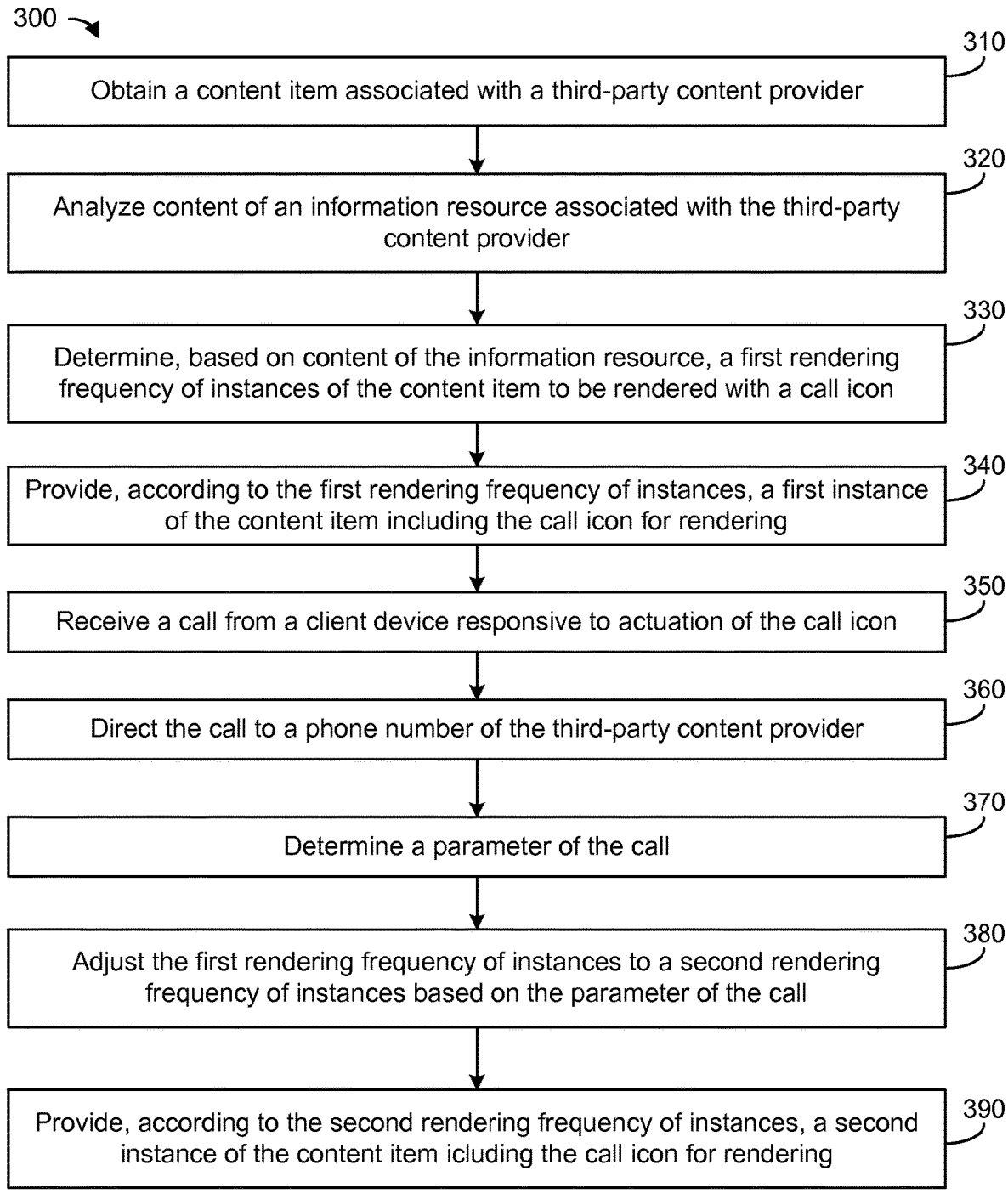
FIG. 3 is a flowchart illustrating a method of providing and managing third-party content items with call functionality.

FIG. 3 is a flowchart illustrating a method 300 of providing and managing third-party content items with call functionality. In brief, the method 300 includes obtaining a third-party content item associated with a third-party content provider (act 310), analyzing content of an information resource associated with the third-party content provider (act 320), determining based on the analysis of the content of the information resource a first rendering frequency of instances of the third-party content item to be rendered with a call icon (act 330) and providing, in accordance with the first rendering frequency of instances, a first instance of the third-party content item including the call icon for display on a first user device (act 340). The method 300 also includes receiving a call from the user device responsive to actuating the call icon (act 350), directing the call to a phone number associated with the third-party content provider (act 360), determining a parameter associated of the call (act 370), adjusting the first rendering frequency of the instances to a second rendering frequency of instances based on the parameter of the call (act 380), and providing, in accordance with the second rendering frequency of instances, a second instance of the third-party content item including the call functionality for rendering on a second user device (act 390).

The method 300 can be performed by a data processing system including at least one processor and a call bridge device 214 such as the content item management system 104 or a content delivery system. The method 300 can be performed as described above with regard to FIG. 2. In particular, the method 300 can include the data processing system obtaining a third-party content item associated with a third-party content provider (act 310). The data processing system can retrieve the third party content item from a third-party content server 106 or can receive the third-party content item directly from a third-party content system 102.

The method 300 can include the data processing system analyzing content of an information resource (such as a website) associated with the third-party content provider (act 320). The data processing system can parse and analyze a document object model (DOM) tree, cascading style sheets (CSS), loaded text or optical character recognition (OCR) of the information resource. As discussed with regard to FIG. 2 above, based at least in part on the analysis of the content of the information resource, the data processing system determining a first rendering frequency (such as rendering frequency, ratio, percentage or frequency) of instances of the third-party content item for rendering with a call icon (act 330). The rendering frequency of instances can include a percentage, ratio or frequency of bids for selecting the content item for rendering with the call functionality. For instance, the data processing system can initially determine that 50% of the bids (or a certain number of bids per day) associated with the content item would be bids for rendering the content item with the call functionality. In some implementations, the rendering frequency of instances can include a percentage, ratio or frequency of instances of the content item to be provided for rendering. For instance, the data processing system can initially determine that 50% of winning bids (or a certain number of winning bids per day) associated with the content item would lead to rendering the content item with the call functionality. In some implementations, the initial rendering frequency of instances can be equal to a default value once the data processing system determines that call functionality would enhance the performance of the content item. In some implementations, the data processing system can determine the initial rendering frequency of instances based on information associated with the information resource of the third-party content provider or information obtained from the third-party content provider, such as the type or size of the business. For instance, for a business with a relatively large group of sales personnel or a taxi service business, the data processing system can assign a relatively large rendering frequency of instances (such as larger than 50%) of the content item to be provided for rendering with call functionality.

The method 300 can include the data processing system providing, in accordance with the first rendering frequency of instances, a first instance of the third-party content item including the call icon for display on a first user device (act 340). The data processing system can also provide, in accordance with the first rendering frequency of instances, instances of the third-party content item for rendering without the call icon 10. Providing the first instance of the content item for rendering with call functionality in accordance with the first rendering frequency of instances can include generating a call extension including a call icon 10. The data processing system can provide the call extension for rendering with (or within) the content item. Generating the call extension can include dynamically assigning a phone number, among a plurality of phone numbers associated with the data processing system, to the call icon 10.

The method 300 also can include the call bridge device 214 receiving a call from the first user device responsive to actuating the call icon (act 350) and directing the call to a phone number associated with the third-party content provider (act 360). As discussed with the regard to FIG. 2, the call icon can assigned a phone number associated with the call bridge device 214 such that, upon initiation of a call, for instance, by the first user device, the call is received by the call bridge device 214. In some implementations, the call bridge device 214 can be configured to maintain a data structure mapping the phone number assigned to call icon 10 to the phone number of the third-party content provider (such the phone number retrieved from the information resource associated with the third-party content provider). The call bridge device 214 can forward the received call, for instance, based on the maintained data structure to the phone number associated with the third-party content provider.

The method 300 can also include the call bridge device 214 determining (or monitoring) at least one parameter associated of the call (act 370) and providing such parameter (s) to the at least one processor. The at least one parameter of the call can include call latency time (i.e., wait time till the call is answered or user device 108 hangs up), indication of whether the call is answered or not, duration of the call, geographical location of the calling user device 108 (for instance, by using the respective IP address, area code or global positioning service (GPS) information), time and date of the call, an indication of the phone number associated with the call bridge device 214 used to initiate the call, or a combination thereof. The data processing system can obtain the call parameter(s) from the call bridge device 214 and store such parameter(s) (or respective statistical values) in relation with an identification of the content item, a type of user device, a geographical location, a keyword used in selecting the first content item instance for rendering or other features. The data processing system can also obtain from the third-party content provider conversion information of the call forwarded to the phone number associated with the third-party content provider. The data processing system can store indication of the conversion information in association with an identification of the content item, a type of user device, a geographical location, a keyword used in selecting the first content item instance for rendering or other features.

The method 300 can include the data processing system adjusting the first rendering frequency of the instances to a second rendering frequency of instances based on the parameter of the call (act 380). Adjusting the first rendering frequency of instances can include adjusting the initial rendering frequency of instances to a second rendering frequency of instances smaller than the initial rendering frequency, for instance, if the call latency (or an average thereof) is high or the call success rate (or an average thereof) is low. In some implementations, such adjustment can be applied to rendering frequency(s) associated with a given time period (such as a time of day or date) when the call latency is high or when the call success rate is low. Adjusting the first rendering frequency of instances can include adjusting the rendering frequency of instances associated with a given keyword, a given geographic location, a given time period or a given type of user devices. In some implementations, upon determining that content item instances including the call functionality are performing significantly better than instances rendered with the link of the information resource, the data processing system can increase the rendering frequency of instances for rendering with the call icon 10 while reducing the rendering frequency of instances for rendering with the link of the information resource. In some implementations, a plurality of factors can be considered at the same time when deciding whether to adjust a rendering frequency of instances of the content item.

In some implementations, the data processing system can identify, among a list of keywords associated with the third-party content item, a keyword used to select instances of the third-party content item for rendering and update a performance metric associated with the keyword based on the parameter of the call. For instance, if the call results in a conversion, the data processing system can update a conversion rate associated with the keyword used for selecting the first instance of the content item. Also, the data processing system can update a call initiation ratio, a call success rate or an average call latency value associated with the keyword used for selecting the first instance of the content item. In some implementations, the data processing system can a rendering frequency of instances of the third-party content item for rendering with the call icon associated with the keyword used for selecting the first instance of the content item.

The method 30 can include the data processing system providing, in accordance with the second rendering frequency of instances, one or more instances of the third-party content item including the call icon for rendering on user devices (act 390). In some implementations, the data processing system can provide instances of the third-party content item for rendering without the call icon in accordance with the second rendering frequency of instances.

Figure 4:
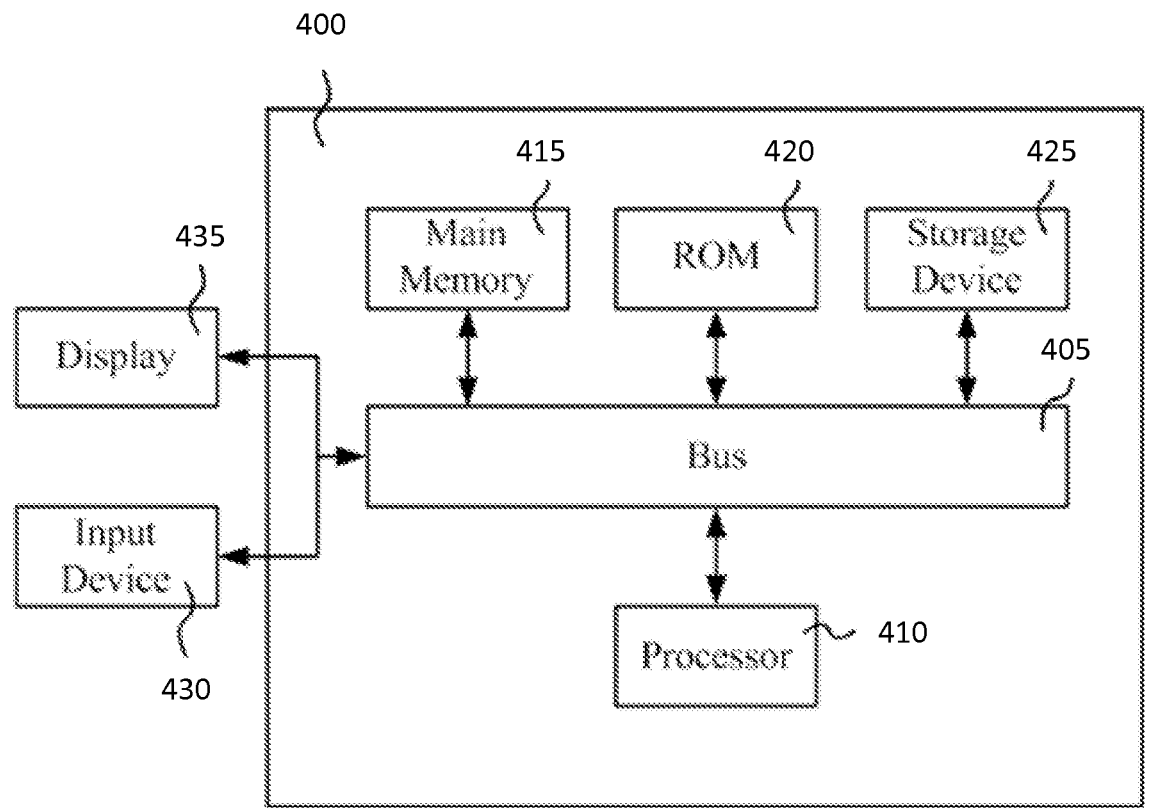
FIG. 4 is a block diagram of a computer system that can be used to implement one or more devices described in this disclosure.

FIG. 4 is a block diagram of a computer system 400 that can be used to implement the user device 108, the computer server 204, data processing system 110, third-party content server 106, resource server 110, the content item management system 104, the content item identification system 112 or a device associated with any of the systems described herein. The computing system 400 includes a bus 405 or other communication component for communicating information and a processor 410 coupled to the bus 405 for processing information. The computing system 400 can also include one or more processors 410 coupled to the bus for processing information. The computing system 400 also includes main memory 415, such as a RAM or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a ROM 420 or other static storage device coupled to the bus 405 for storing static information and instructions for the processor 410. A storage device 425, such as a solid state device, magnetic disk or optical disk, is coupled to the bus 405 for persistently storing information and instructions. Computing device 400 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 400 may be coupled via the bus 405 to a display 435, such as a Liquid Crystal Display (LCD), Thin-Film-Transistor LCD (TFT), an Organic Light Emitting Diode (OLED) display, LED display, Electronic Paper display, Plasma Display Panel (PDP), or other display, etc., for displaying information to a user. An input device 430, such as a keyboard including alphanumeric and other keys, may be coupled to the bus 405 for communicating information and command selections to the processor 410. In another implementation, the input device 430 may be integrated with the display 435, such as in a touch screen display. The input device 430 can include a cursor control, such as a mouse, a trackball, or cursor direction keys, for communicating direction information and command selections to the processor 410 and for controlling cursor movement on the display 435.

According to various implementations, the processes or methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes or method ACTs described herein. One or more processors in a multi-processing arrangement may also be employed to execute the instructions contained in main memory 415. In alternative implementations, hard-wired circuitry may be used in place of or in combination with software instructions to effect illustrative implementations. Thus, implementations are not limited to any specific combination of hardware circuitry and software.

Although an implementation of a computing system 400 has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, e.g., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processing apparatus," "computing device," or "processing circuit" encompass all kinds of apparatus, devices, and machines for processing data, including by way of example a programmable processor, a computer, a system on a chip, or multiple ones, a rendering frequency of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a rendering frequency of a file that holds other programs or data (e.g., one or more scripts stored in a markup language document), in a single file dedicated to the program in question, or in multiple coordinated files (e.g., files that store one or more modules, sub-programs, or rendering frequency of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made without departing from the spirit and scope of the appended claims. All implementations that come within the spirit and scope of the following claims and equivalents thereto are claimed.

What is claimed is:

1. A computer-implemented method of extracting contact information from a resource and associating the contact information with a content item, comprising:

receiving, by a data processing system, a content item and uniform resource locator (URL) from a content provider computing device, the URL identifying a resource;

loading, by the data processing system, the resource identified by the received URL;

detecting, by the data processing system, a plurality of contact information from the loaded resource, the plurality of contact information comprising a first contact information and a second contact information;

determining, by the data processing system prior to associating contact information with the content item, a prominence score for each contact information of the plurality of contact information by analyzing an object tree of the resource or analyzing a result of optical character recognition of the resource;

selecting, by the data processing system, the first contact information and the second contact information of the plurality of contact information based on the calculated prominence scores;

associating, by the data processing system, the selected first contact information and the second contact information with the content item;

receiving a request from a computing device, the request including location information for the computing device;

selecting, by a data processing system, one of the first contact information or the second contact information responsive to the location information;

modifying, responsive to the request, the content item by embedding the one of the first contact information or the second content information selected based on the location information provided with the request and the calculated prominence scores with a selectable button for the content item; and serving the content item with the selectable button to the computing device responsive to the request, the computing device contacting the content provider using the selected one of the first contact information or the second contact information responsive to a selection of the selectable button.

2. The method of claim 1, further comprising:
determining the domain of the received URL;
finding a plurality of URLs under the domain, each plurality of URL identifying a resource that is less than a predetermined number of arcs from the received URL; and
wherein loading the resource comprises loading a plurality of resources identified by the plurality of URLs.

3. The method of claim 1, wherein loading the resource comprises:
parsing the resource into the object tree;
rendering the resource using the object tree; and
wherein detecting the plurality of contact information further comprises detecting the plurality of contact information using optical character recognition from the rendered resource.

4. The method of claim 1, further comprising:
filtering a portion of the loaded resource; and
wherein detecting the plurality of contact information comprises detecting the plurality of contact information from an unfiltered portion of the loaded resource.

5. The method of claim 1, wherein each prominence score for each of the plurality of contact information comprises a weighted sum of a plurality of signals associated with a respective contact information.

6. The method of claim 5, wherein a signal of the plurality of signals is computed using one of:
a number of times the respective contact information is shown on the loaded resource;
a number of other contact information detected on the loaded resource;
a typographic emphasis of a respective contact information;
a location of the contact information within the loaded resource;
a text located near the respective contact information within the loaded resource; or
a prominence of an image associated with the respective contact information referenced by the loaded resource.

7. The method of claim 1, wherein selecting the first contact information and the second contact information of the plurality of contact information further comprises culling contact information below a predetermine minimum threshold value.

8. The method of claim 1, wherein selecting the first contact information and the second contact information of the plurality of contact information comprises:
electing a subset of contact information from the plurality of contact information; and
receiving, from the content provider computing device, a selection of the first contact information and the second contact information out of the subset of contact information.

9. The method of claim 1, wherein selecting the first contact information and the second contact information of the plurality of contact information comprises:
receiving, from the content provider computing device, a response that the selected first contact information and the second contact information is accurate responsive to the respective prominence score of the selected first contact information and the second contact information falling below a confidence threshold value.

10. The method of claim 1, wherein the first contact information and the second contact information comprises one of a phone number, mailing address, email address, fax number, instant messaging handle, social media profile, payment information, or bank routing number.

11. A system for extracting contact information from a resource and associating the contact information with a content item comprising:
one or more processors; and one or more storage devices storing instructions that, when executed by the one or more processors, cause the one or more processors to:
receive a content item and uniform resource locator (URL) from a content provider computing device, the URL identifying a resource;
load the resource identified by the received URL;
detect a plurality of contact information from the loaded resource, the plurality of contact information comprising a first contact information and a second contact information;
determine, prior to association of contact information with the content item, a prominence score for each of the plurality of contact information by analyzing an object tree of the resource or analyzing a result of optical character recognition of the resource;
select the first contact information and the second contact information of the plurality of information based on the calculated prominence scores; and
associate the selected first contact information and the second contact information with the content item;
receive a request from a computing device, the request including location information for the computing device;
select one of the first contact information or the second contact information responsive to the location information;
modify, responsive to the request, the content item by embedding the one of the first contact information or the second content information selected based on the location information provided with the request and the calculated prominence scores with a selectable button for the content item; and
serve the content item with the selectable button to the computing device responsive to the request, the computing device dialing a number of the content provider using the selected one of the first contact information or the second contact information responsive to a selection of the selectable button.

12. The system of claim 11, comprising the one or more processors to:
    determine the domain of the received URL;
    find a plurality of URLs under the domain, each plurality of URL identifying a resource that is less than a predetermined number of arcs from the received URL; and
    load a plurality of resources identified by the plurality of URLs.

13. The system of claim 11, comprising the one or more processors to:
    parse the resource into the object tree;
    render the resource using the object tree; and
    detect the plurality of contact information using optical character recognition from the rendered resource.

14. The system of claim 11, comprising the one or more processors to:
    filter a portion of the loaded resource; and
    detect the plurality of contact information from an unfiltered portion of the loaded resource.

15. The system of claim 11, wherein each prominence score for each of the plurality of contact information comprises a weighted sum of a plurality of signals associated with a respective contact information.

16. The system of claim 15, wherein a signal of the plurality of signals is computed using one of:
    a number of times the respective contact information is shown on the loaded resource;
    a number of other contact information detected on the loaded resource;
    a typographic emphasis of a respective contact information;
    a location of the contact information within the loaded resource;
    a text located near the respective contact information within the loaded resource; or
    a prominence of an image associated with the respective contact information referenced by the loaded resource.

17. The system of claim 11, comprising the one or more processors to select the first contact information and the second contact information further comprises culling contact information below a predetermine minimum threshold value.

18. The system of claim 11, comprising the one or more processors to:
    elect a subset of contact information from the plurality of contact information; and
    receive, from the content provider computing device, a selection of the first contact information and the second contact information out of the subset of contact information.

19. The system of claim 11, comprising the one or more processors to:
    receive, from the content provider computing device, a response that the selected first contact information and the second contact information is accurate responsive to the respective prominence score of the selected first contact information and the second contact information falling below a confidence threshold value.

20. The system of claim 11, wherein the first contact information and the second contact information comprises a phone number.

* * * * *